United States Patent [19]

DeGiovanni et al.

[11] Patent Number: 4,970,033

[45] Date of Patent: Nov. 13, 1990

[54] PROCESS FOR CASTING TIRE TREAD IMPRESSIONS USING A PHOTOPOLYMERIZABLE COMPOSITION AS THE CASTING MATERIAL

[75] Inventors: Joseph DeGiovanni, Rawlings, Md.; Richard B. Schroeder, Wilmington, Del.

[73] Assignee: Hercules Incorporated, Wilmington, Del.

[21] Appl. No.: 390,133

[22] Filed: Aug. 7, 1989

Related U.S. Application Data

[63] Continuation-in-part of Ser. No. 165,657, Mar. 8, 1988, abandoned.

[51] Int. Cl.$^5$ .............................................. B29C 35/08
[52] U.S. Cl. ..................................... 264/22; 264/40.1; 264/102; 264/220; 264/225; 425/174.4
[58] Field of Search ................. 264/22, 40.1, 219–227, 264/102; 425/174.4

[56] References Cited

U.S. PATENT DOCUMENTS

| | | | |
|---|---|---|---|
| 2,560,052 | 7/1951 | Miller et al. | 264/227 |
| 2,982,998 | 5/1961 | Smith et al. | 264/227 |
| 3,374,297 | 3/1968 | Henderson | 264/40 |
| 3,415,923 | 12/1968 | Petersen | 264/219 |
| 3,798,134 | 3/1974 | Hynes | 204/6 |
| 4,073,577 | 2/1978 | Hofer | 351/160 |
| 4,444,607 | 4/1984 | Lash et al. | 156/58 |
| 4,595,543 | 6/1986 | Williams | 264/22 |
| 4,814,119 | 3/1989 | Scholz | 264/22 |

FOREIGN PATENT DOCUMENTS

| | | |
|---|---|---|
| 715361 | 2/1980 | U.S.S.R. |
| 1023221 | 6/1983 | U.S.S.R. |

OTHER PUBLICATIONS

Hercules Automotive Testing Services Bulletin.

*Primary Examiner*—Jeffery Thurlow
*Attorney, Agent, or Firm*—Joanne W. Patterson

[57] ABSTRACT

Disclosed is an improved process for casting the impression of a tire tread by preparing a negative mold of the tire tread and making a positive cast from the negative mold. The improvement consists of pouring a liquid photopolymerizable composition into the negative mold of the tire tread, applying a vacuum, exposing the composition to ultraviolet radiation to cross-link the polymer, removing the positive cast from the negative mold, and exposing the cast to additional ultraviolet radiation in the absence of oxygen to harden the surface of the cast.

1 Claim, No Drawings

PROCESS FOR CASTING TIRE TREAD IMPRESSIONS USING A PHOTOPOLYMERIZABLE COMPOSITION AS THE CASTING MATERIAL

This application is a continuation in part of application Ser. No. 07/165,657 filed Mar. 8, 1988, now abandoned.

FIELD OF THE INVENTION

This invention relates to a process for making an impression of a motor vehicle tire tread. This invention particularly relates to the use of a photopolymerizable composition for making a positive cast of a tire tread from negative mold.

BACKGROUND OF THE INVENTION

Certain automobile and truck tire designs in combination with certain drive train configurations produce tire wear patterns that create noise and can also result in safety problems during use. When new tire designs are tested, existing two dimensional techniques for documenting tire wear patterns, such as photographs and pressure sensitive paper, are inadequate to document the three dimensional wear patterns that are characteristic of irregular tread wear. Irregular tread wear manifests itself as tread elements that are either worn at an angle or have some elements that are worn more than others.

Three dimensional wear patterns can be documented by making a cast of the tire tread. The preparation of a cast involves two separate steps: (1) producing a negative mold from the tire tread and (2) making a positive cast from the negative mold. Existing tire casting methods have traditionally used plaster negatives and plaster or elastomeric positives. These techniques are messy to use because of the tire cleanup steps after the preparations of the negative mold. Current methods are also relatively slow, with curing times of several hours to overnight. These methods are not suitable for the short turnaround times required for tire testing, during which a maximum of 30 minutes is available to make a negative mold of the tire tread while the tires are off of the vehicle for inspection.

SUMMARY OF THE INVENTION

A process has now been found for making impressions of motor vehicle tires that yields high quality reproductions of the tread wear patterns and can be completed in less than an hour. In the process of this invention for casting the impression of tire treads by preparing a negative mold of the tire tread and making a positive cast from the negative mold, the improvement consists essentially of (1) pouring a liquid photopolymerizable composition into the negative mold, (2) applying a vacuum to the photopolymerizable composition, (3) exposing the photopolymerizable composition to ultraviolet radiation for a time sufficient to cross-link the photopolymer, (4) removing the positive cast from the negative mold, and (5) exposing the positive cast to additional ultraviolet radiation in the absence of oxygen for a time sufficient to harden the surface of the cast.

DETAILED DESCRIPTION OF THE INVENTION

The preparation of an impression of a motor vehicle tire tread involves two separate steps: (1) producing a negative mold from the tire tread and (2) making a positive cast from the negative mold. In the first step, the negative mold can be made by any suitable method known in the art. When it is desirable for the entire process to be completed in a short period of time, e.g., less than an hour, use of a eutectic alloy having a melting point below 121° C. is preferred for the preparation of the negative mold. If this melting point is exceeded, the high temperature may degrade the rubber in the tire. Such alloys are commercially available, e.g., INDIUM #162 supplied by Indium Corporation.

In order to prevent voids in the negative mold of the tread surface, the tire is preferably placed in a pool of the liquid molding material so that any entrapped air will rise away from the tread surface. The mold can be any simple retention device to contain the liquid around the tire tread until the liquid hardens, e.g., a ring of rubber tubing covered with polyethylene film. Best results are obtained if the tire is pushed into the liquid to force air out rather than pouring the liquid into the mold after the tire is in place.

Step two of the process for producing the impression of the tire tread involves preparing a positive cast from the negative mold. In the process of this invention, a liquid photopolymerizable composition is poured over the surface of the negative mold and a vacuum is applied to remove entrained air. An evacuation time of about two minutes is preferred. The photopolymerizable composition is then exposed to ultraviolet (UV) radiation for a time sufficient to cross-link the Photopolymer. The cross-linking time will depend upon the thickness of the layer of photopolymerizable composition over the negative mold, but is typically about 30 minutes. The thickness of the finished cast depends upon the size of the tire tread, but is typically from about ¾ inch to about 1¼ inch. The wavelength of the UV radiation preferably peaks between 300–400 angstroms and the intensity of the irradiation is preferably from about 1 to about 5 milliwatts/cm². Suitable ultraviolet radiation sources are available commercially, e.g., MERIGRAPH ® type 50 or type 3040 A exposure units (Hercules Incorporated). The mold is preferably cooled during the cross-linking step. After removing the positive cast from the negative mold, the cast is exposed to additional UV radiation in the absence of oxygen for a time sufficient to harden the surface of the cast, typically about 5 minutes. Oxygen can be excluded, for example, by carrying out the final irradiation step under nitrogen or by submerging the positive cast in a solution containing an oxygen inhibitor. The cast can then he painted with a flat black enamel paint. The finished product looks and feels like the original tire tread.

The photopolymerizable composition used for preparing the positive cast can be any liquid photopolymerizable composition that is capable of curing in the presence of ultraviolet light in less than about 30 minutes when the layer of the composition is about ¾ inch thick. Such compositions are available commercially, for example, MERIGRAPH ® L4000 photopolymer resin sold by Hercules Incorporated. When MERIGRAPH ® photopolymer resin is used as the casting material, oxygen can be excluded by submerging the cast in MERIGRAPH ® #3 post-exposure solution (Hercules Incorporated).

What we claim and desire to protect by Letters Patent is:

1. In a process for casting the impression of tire treads by preparing a negative mold of the tire tread and making a positive cast from the negative mold, the improvement consisting essentially of
   (a) pouring a liquid photopolymerizable composition into the negative mold,
   (b) applying a vacuum to the photopolymerizable composition,
   (c) exposing the photopolymerizable composition to ultraviolet radiation for a time sufficient to cross link the photopolymer and form a positive cast of the tire tread,
   (d) removing the positive cast from the negative mold, and
   (e) exposing the positive cast to additional ultraviolet radiation in the absence of oxygen for a time sufficient to harden the surface of the cast.

* * * * *